US010502462B2

(12) United States Patent
Muller

(10) Patent No.: US 10,502,462 B2
(45) Date of Patent: Dec. 10, 2019

(54) MAGNETOCALORIC THERMAL GENERATOR AND METHOD OF COOLING SAME

(71) Applicant: COOLTECH APPLICATIONS, Holtzheim (FR)

(72) Inventor: Christian Muller, Strasbourg (FR)

(73) Assignee: COOLTECH APPLICATIONS, Holtzheim (FR)

( * ) Notice: Subject to any disclaimer, the term of this patent is extended or adjusted under 35 U.S.C. 154(b) by 468 days.

(21) Appl. No.: 15/107,563

(22) PCT Filed: Dec. 22, 2014

(86) PCT No.: PCT/FR2014/053518
§ 371 (c)(1),
(2) Date: Jun. 23, 2016

(87) PCT Pub. No.: WO2015/097401
PCT Pub. Date: Jul. 2, 2015

(65) Prior Publication Data
US 2016/0356528 A1    Dec. 8, 2016

(30) Foreign Application Priority Data
Dec. 27, 2013  (FR) ...................... 13 63661

(51) Int. Cl.
*F25B 21/00*    (2006.01)
(52) U.S. Cl.
CPC ........ *F25B 21/00* (2013.01); *F25B 2321/002* (2013.01); *F25B 2321/0021* (2013.01); *F25B 2321/0022* (2013.01); *Y02B 30/66* (2013.01)
(58) Field of Classification Search
CPC ............... F25B 2321/002; F25B 21/00; F25B 2321/0021; F25B 2321/0022
See application file for complete search history.

(56) References Cited

U.S. PATENT DOCUMENTS

| 5,249,424 A * | 10/1993 | DeGregoria | ............ F25B 21/00 62/3.1 |
| 2002/0053209 A1* | 5/2002 | Zimm | ..................... F25B 21/00 62/3.1 |

(Continued)

FOREIGN PATENT DOCUMENTS

FR    2 983 281 A1    5/2013

OTHER PUBLICATIONS

International Search Report Corresponding to PCT/FR2014/053518 dated Apr. 21, 2015.

(Continued)

*Primary Examiner* — Cassey D Bauer
(74) *Attorney, Agent, or Firm* — Davis & Bujold PLLC; Michael J. Bujold

(57) ABSTRACT

A magnetocaloric thermal generator having a primary circuit fluidically connecting first and second stages of magnetocaloric elements using a heat transfer primary fluid flowing alternately back and forth. The stages being subjected to variable magnetic field of a magnetic system. The primary system includes a cold side and a hot side to which the magnetocaloric elements of the stages are fluidically connected. At least the cold side of the primary circuit has an outlet point connected to another point of the primary circuit, referred to as the injection point, on the hot side by a bypass pipe allowing the primary fluid to be displaced only from the outlet point towards the injection point. The magnetocaloric thermal generator is used in a method for cooling the secondary fluid.

14 Claims, 12 Drawing Sheets

(56) References Cited

U.S. PATENT DOCUMENTS

| | | | |
|---|---|---|---|
| 2005/0047284 A1* | 3/2005 | Takagi | B60H 1/00492 |
| | | | 389/13.14 |
| 2008/0236172 A1 | 10/2008 | Muller et al. | |
| 2011/0162388 A1 | 7/2011 | Barve et al. | |
| 2013/0269924 A1* | 10/2013 | Bugler | F28C 3/08 |
| | | | 165/287 |
| 2014/0290275 A1 | 10/2014 | Muller | |

OTHER PUBLICATIONS

Written Opinion Corresponding to PCT/FR2014/053518 dated Apr. 21, 2015.

* cited by examiner

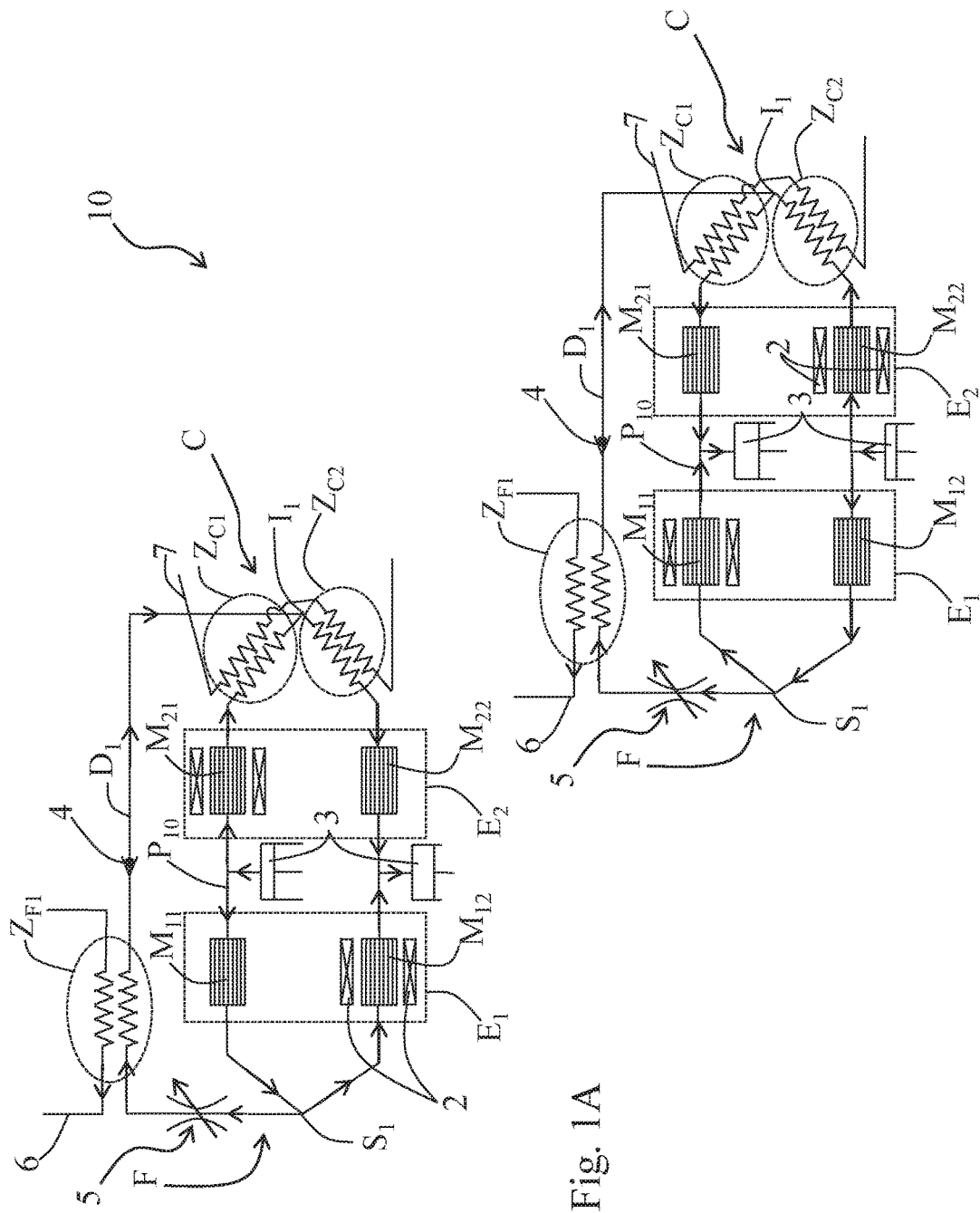

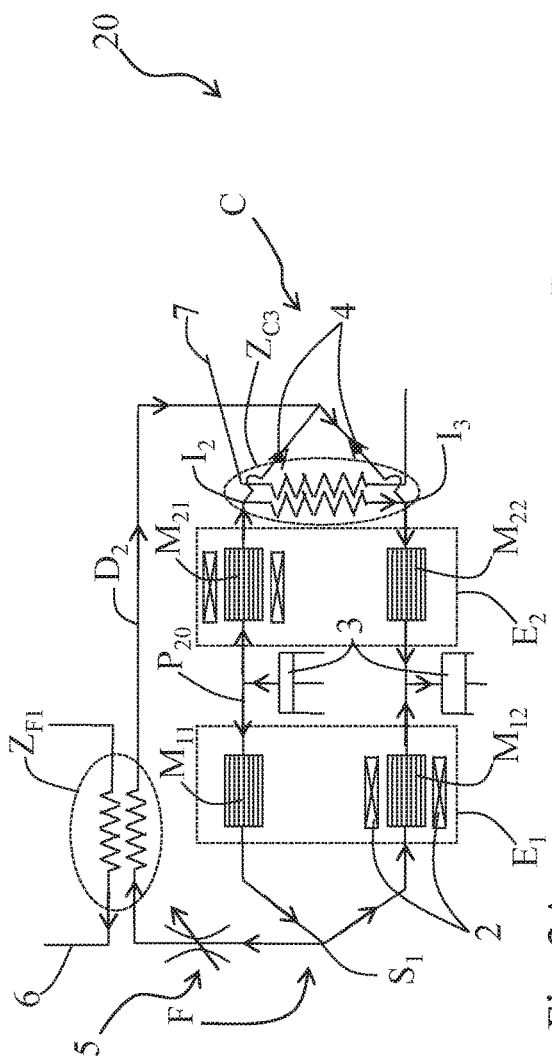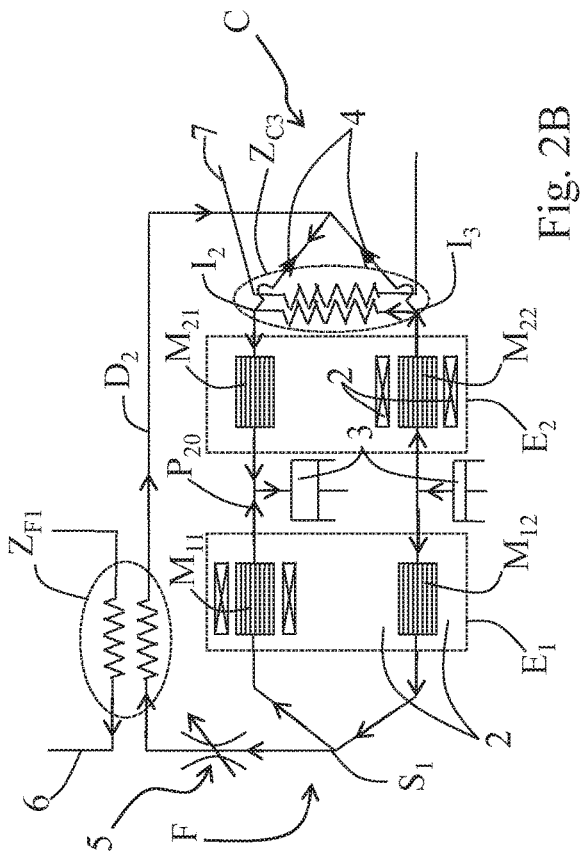
Fig. 2A
Fig. 2B

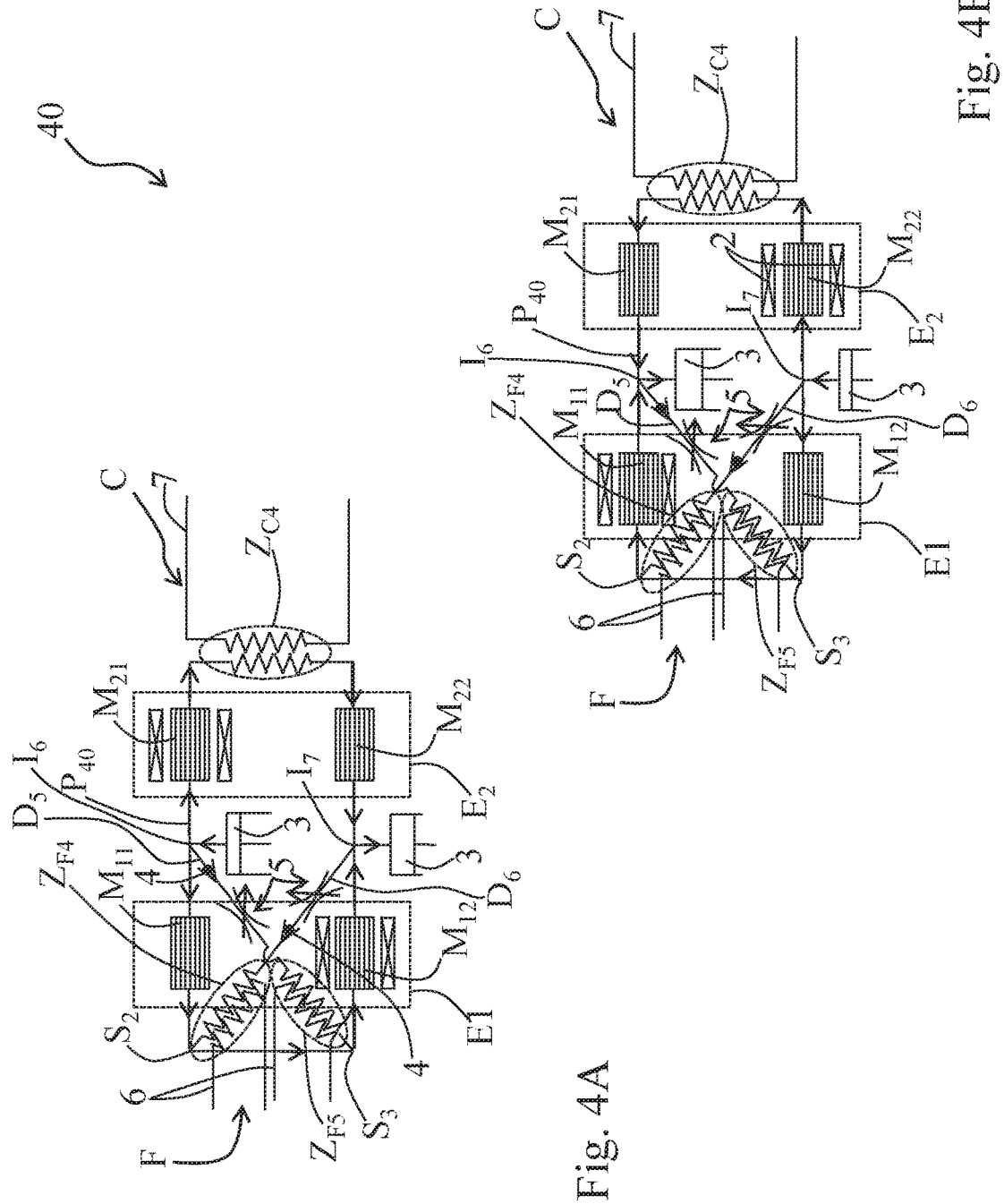

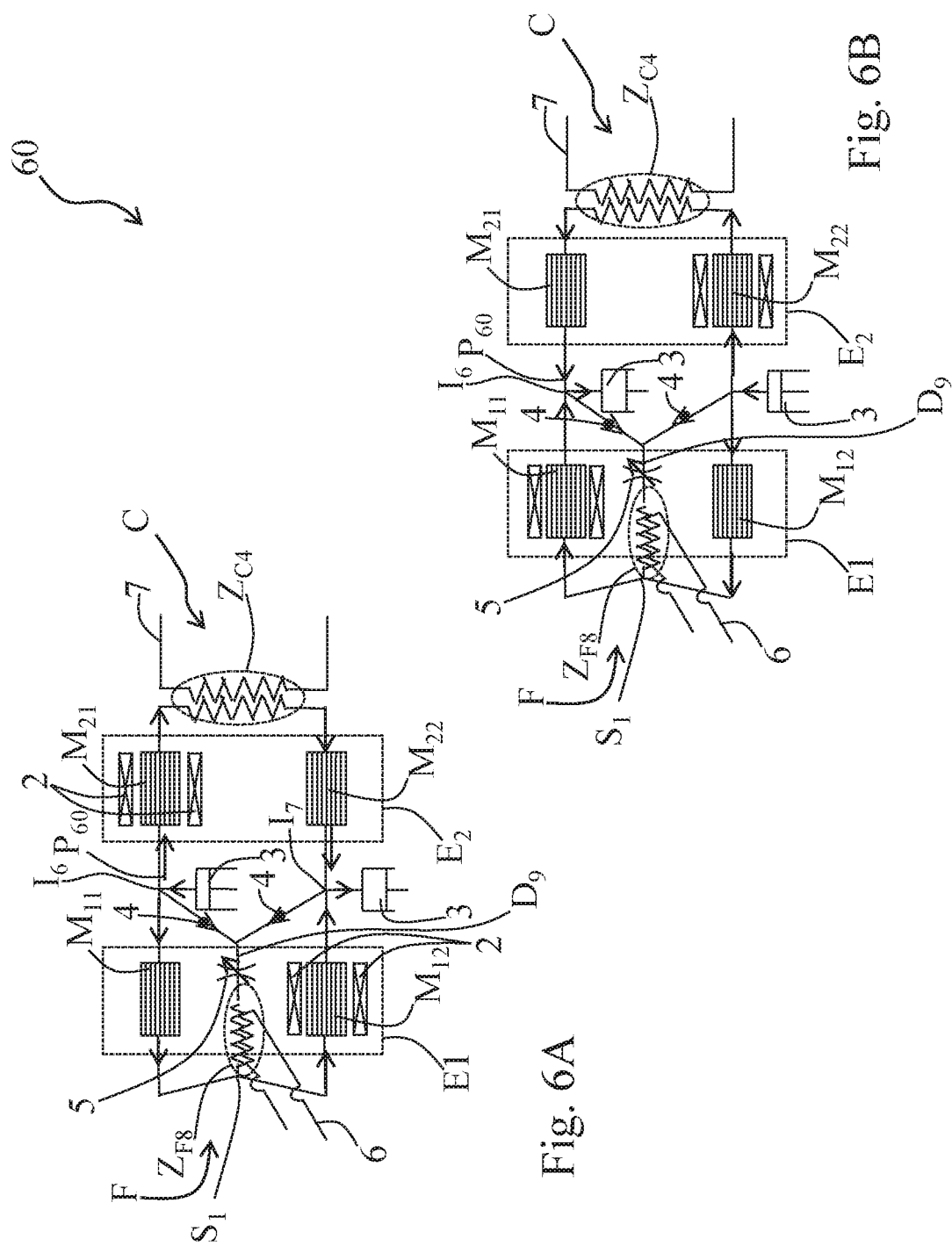

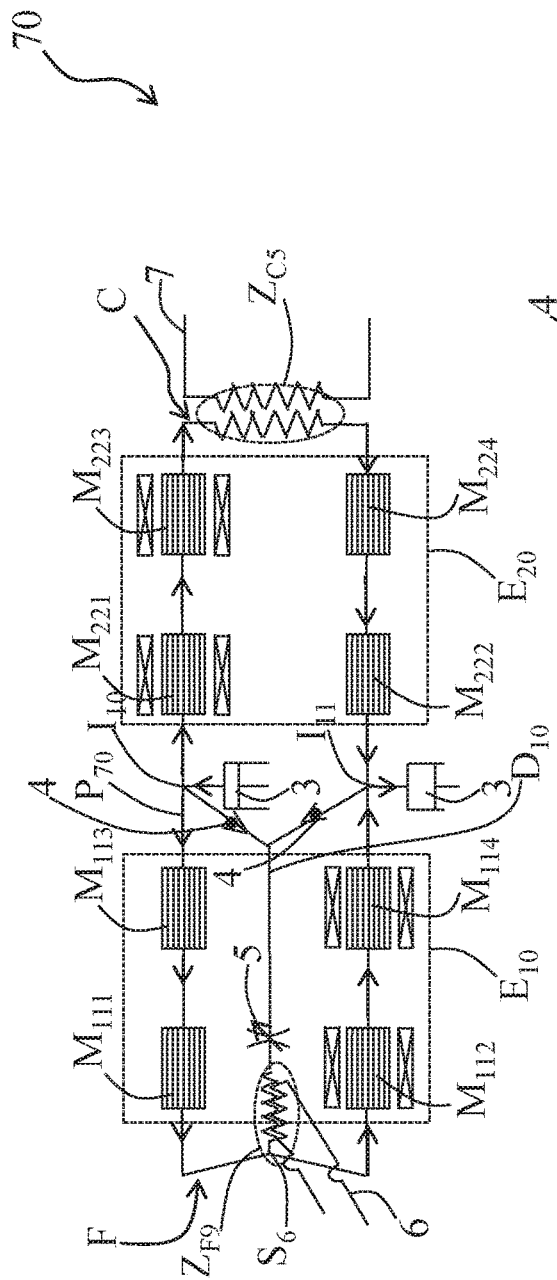
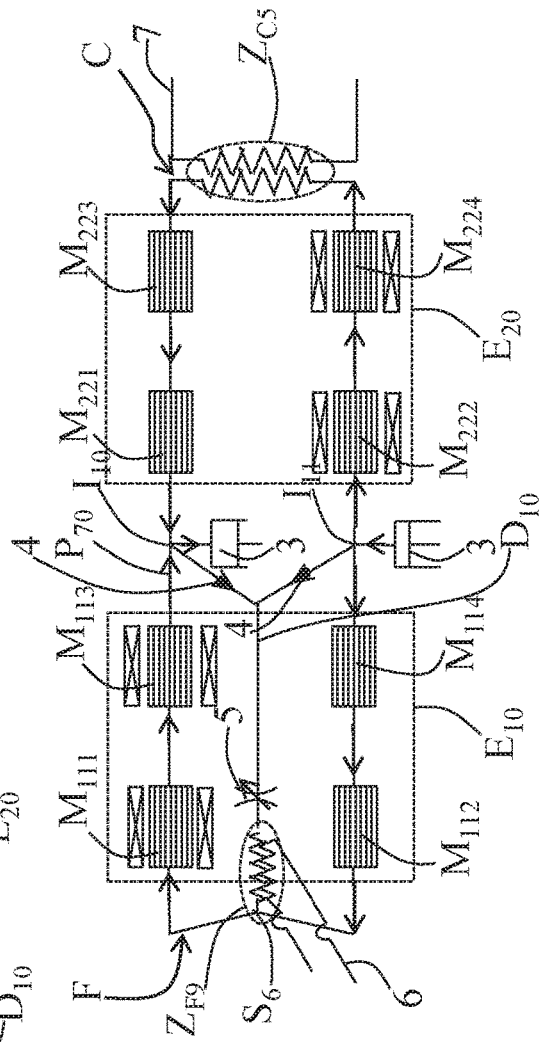
Fig. 7A
Fig. 7B

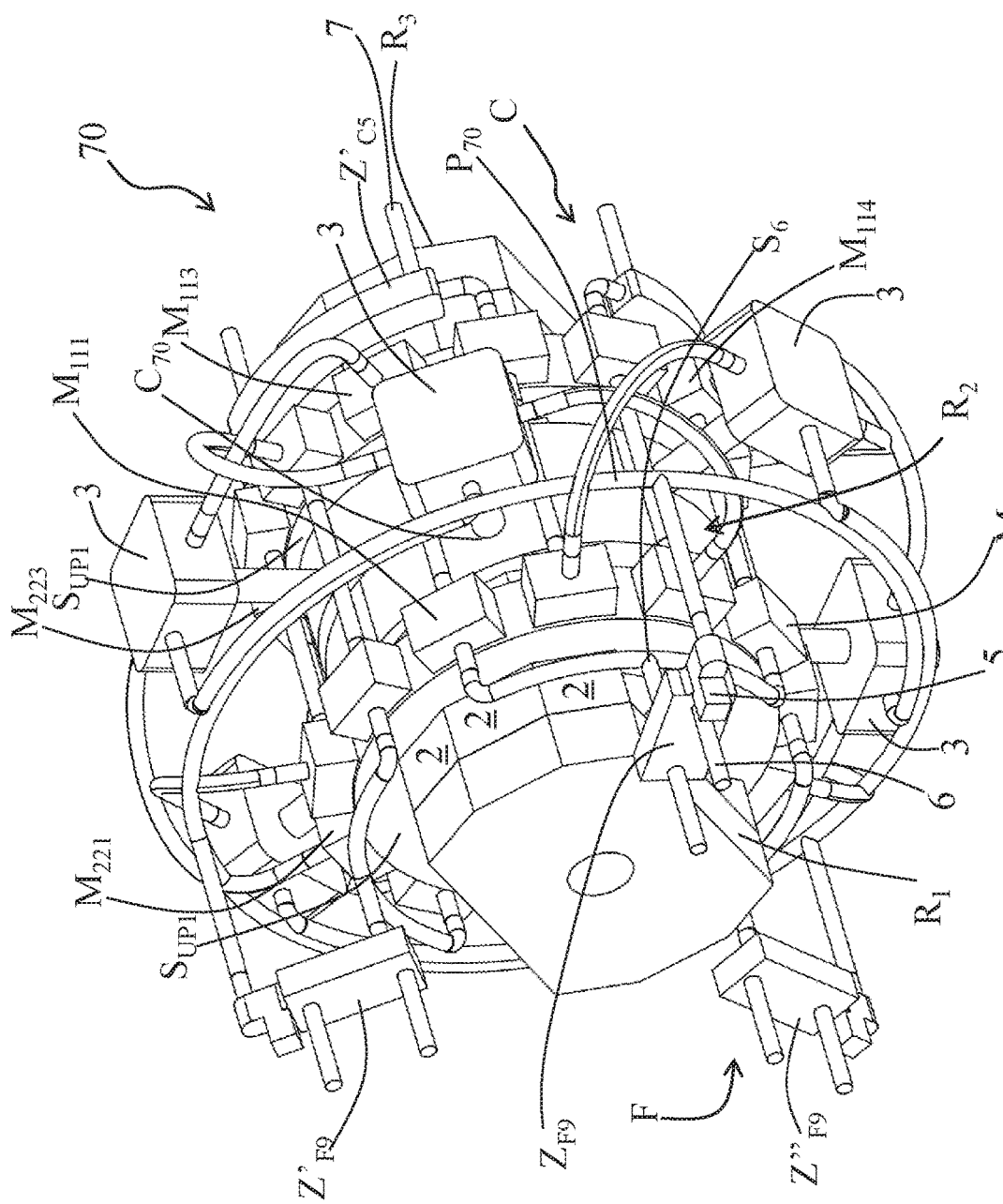

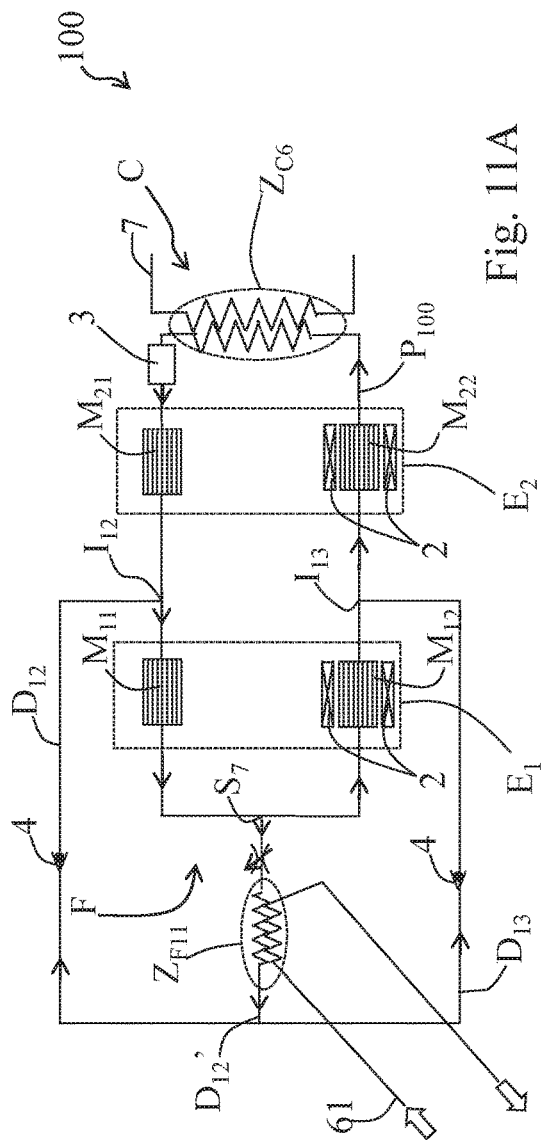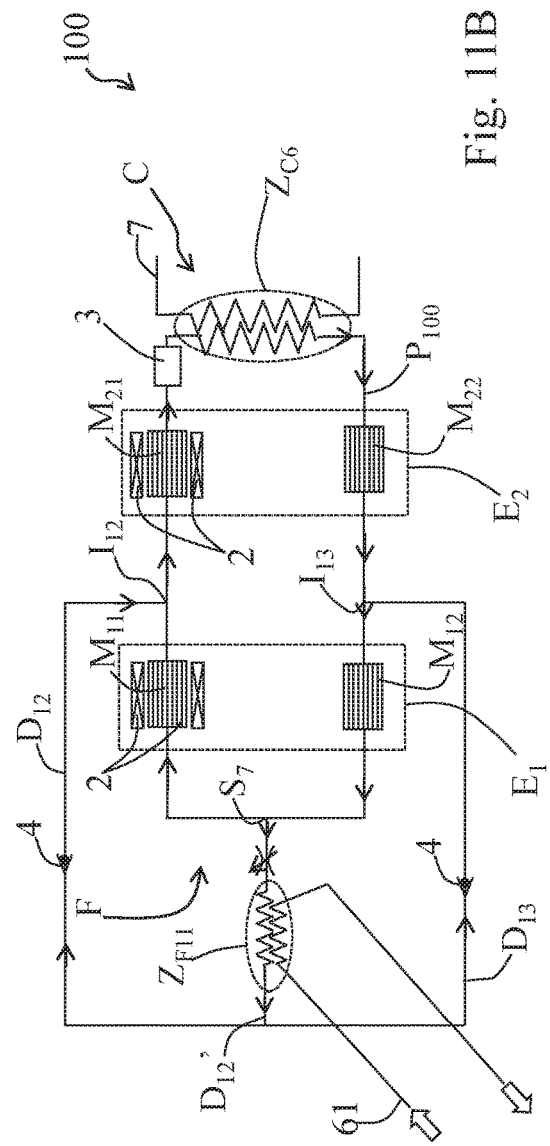

MAGNETOCALORIC THERMAL GENERATOR AND METHOD OF COOLING SAME

TECHNICAL SCOPE

The invention relates to a magnetocaloric thermal generator comprising at least one primary circuit fluidically connecting magnetocaloric elements by means of a heat transfer fluid called primary fluid flowing alternately back and forth, said magnetocaloric elements being subjected to the variable magnetic field of a magnetic system that creates alternately in each magnetocaloric element a magnetic heating phase and a magnetic cooling phase, generator wherein the primary circuit comprises a cold side and a hot side at which magnetocaloric elements are fluidically connected with each other.

It also relates to a method for cooling a fluid called secondary fluid by a magnetocaloric thermal generator.

PRIOR ART

Magnetic refrigeration technology at ambient temperature has been known for more than thirty years and the advantages it provides in terms of ecology and sustainable development are widely acknowledged. Its limits in terms of its useful calorific output and its efficiency are also well known. Consequently, all the research undertaken in this field tends to improve the performances of such a generator, by adjusting the various parameters, such as the magnetization power, the performances of the magnetocaloric element, the exchange surface between the heat transfer fluid and the magnetocaloric elements, the performances of the heat exchangers, etc.

These thermal generators use the magnetocaloric effect (MCE) of certain materials, which consists in a variation of their temperature when they are subjected to a variable magnetic field. In such generators, the magnetocaloric materials are subjected to a succession of magnetic magnetization and demagnetization phases and a heat exchange is performed with a heat transfer fluid called primary fluid in order to collect the thermal energy produced by said materials and achieve the widest temperature variation possible in these materials (temperature gradient). For that purpose, the circulation of the primary fluid is alternated and this primary fluid circulates in channels or pores passing through the magnetocaloric material. A magnetocaloric cycle comprises two phases, that is to say a magnetization phase and a demagnetization phase, which translate in energy available at every phase. This cycle is repeated up to frequencies of several Hertz. During these phases, the primary fluid flows through the magnetocaloric material and will either heat up at the contact of the material during a so-called magnetization phase, or cool down at the contact of the material during a so-called demagnetization phase. The magnetocaloric effect, which corresponds to an entropy variation of said material, is maximal when the temperature of the material is close to its Curie temperature.

Now, a magnetocaloric thermal generator must be able to exchange the thermal energy it produces with at least one external application. This exchange is generally achieved by one or several heat exchangers with the objective of restituting to or exchanging with one or several applications, which are external to said magnetocaloric thermal generator, the thermal energy produced by said thermal generator. These external applications can be the air surrounding the thermal generator, a thermal device or enclosure, for example.

In a classical configuration, the magnetocaloric elements of a magnetocaloric thermal generator are connected to each other on the hot side by means of a heat exchanger and, symmetrically, they are also connected to each other on the cold side by means of another heat exchanger. However, experience has shown that such configuration has limitations.

This is especially the case when the cold side of the generator is exploited. The fact of performing a heat exchange with an application or a secondary circuit showing a great temperature difference with respect to the temperature of the primary fluid results in considerable heating of the cold side of the generator and degradation of its thermal efficiency. In other words, the thermal gradient established in the thermal generator is degraded, so that a part of the output produced by the magnetocaloric effect must be used to restore this gradient and, consequently, this part of the output cannot be exploited or used by the external application(s).

Likewise, when the hot side of the thermal generator is exploited, there is a risk of cooling the hot side of the generator and of degrading its thermal efficiency.

To exploit optimally the output of a thermal generator, it is thus necessary to optimize the heat exchange characteristics between the primary circuit and the secondary circuit.

DESCRIPTION OF THE INVENTION

The present invention aims to overcome these disadvantages by offering a solution to the above-mentioned problems. To that purpose, the magnetocaloric thermal generator according to the invention is designed so as to optimize the thermal energy transfer between the thermal generator and the external application(s) to be refrigerated, cooled or heated, in order to have the lowest possible impact on the thermal gradient established in the magnetocaloric thermal generator and on its thermal output. Another subject of the invention is a magnetocaloric thermal generator particularly suitable for continuous cooling of a fluid circulating in a secondary circuit.

To that purpose, this invention offers a magnetocaloric thermal generator of the kind described in the preamble, characterized in that at least one of said hot and cold sides of the primary circuit comprises at least one outlet point connected to another point of the primary circuit, called injection point, by means of at least one bypass pipe allowing the primary fluid to be displaced only in one direction, only from the outlet point towards the injection point.

In a preferred embodiment, the magnetocaloric elements can be distributed in at least two stages, and the magnetocaloric elements of one of said stages can be connected fluidically with each other on the cold side and the magnetocaloric elements of another of said stages can be connected fluidically with each other on the hot side.

In a first variant, the magnetocaloric elements of two connected stages can be constantly in a reversed magnetic phase. In another variant, the magnetocaloric elements of two connected stages can be constantly in an identical magnetic phase.

According to the invention, the bypass pipe can be thermally connected to a secondary circuit by at least one heat exchange zone.

Moreover, said heat exchange zone can be designed to achieve a counter-current, co-current or cross-current displacement between the primary fluid and a secondary fluid of said secondary circuit.

The bypass line can advantageously comprise a device for adjusting the flow rate of the primary fluid that circulates in it.

In an embodiment, said at least one outlet point is located in the cold side of the primary circuit. In this embodiment, die injection point can be located in the hot side of the primary circuit.

In a second embodiment, said at least one outlet point is located in the hot side of the primary circuit. In this embodiment, the injection point can be located in the cold side of the primary circuit.

In both embodiments, the injection point can be, as a variant, located between two stages of magnetocaloric elements.

In a further variant, the injection point can be located between consecutive magnetocaloric elements of each stage.

This invention also offers a method for cooling a fluid called secondary fluid by means of a magnetocaloric thermal generator of the kind described in the preamble, characterized in that it consists in connecting thermally the secondary circuit in which the secondary fluid circulates by means of at least one heat exchange zone to a bypass pipe of said magnetocaloric thermal generator and to have said secondary fluid circulating continuously in said secondary circuit.

Such method is particularly suitable for achieving the cooling of a secondary fluid that is permanently renewed. So, this method is advantageous for cooling a secondary fluid that flows in a secondary circuit that does not loop back on itself and in which the hydraulic flow and the thermal flow of the secondary fluid are continuous.

BRIEF DESCRIPTION OF THE DRAWINGS

The present invention and its advantages will be better revealed in the following description of the embodiments given as non limiting examples, in reference to the drawings in appendix, in which:

FIGS. 1A and 1B are schematic views of two stages of a thermal generator according to a first embodiment variant, in opposite magnetic phases, FIGS. 2A to 2B are schematic views of two stages of a thermal generator according to a second embodiment variant, in opposite magnetic phases, FIGS. 4A and 4B are schematic views of two stages of a thermal generator according to a fourth embodiment variant, in opposite magnetic phases, FIGS. 6A and 6B are schematic views of two stages of a thermal generator according to a sixth embodiment variant, in opposite magnetic phases, FIGS. 7A and 7B are schematic views of two stages of a thermal generator according to a seventh embodiment variant, in opposite magnetic phases, FIG. 9 is a simplified perspective view of the thermal generator comprising the two stages represented schematically in FIGS. 7A and 7B, FIGS. 10A and 10B are schematic views of two stages of a thermal generator according to a ninth embodiment variant, in opposite magnetic phases, FIGS. 11A and 11B are schematic views of two stages of a thermal generator according to a tenth embodiment variant, in opposite magnetic phases.

ILLUSTRATION OF THE INVENTION

Figure 3A:
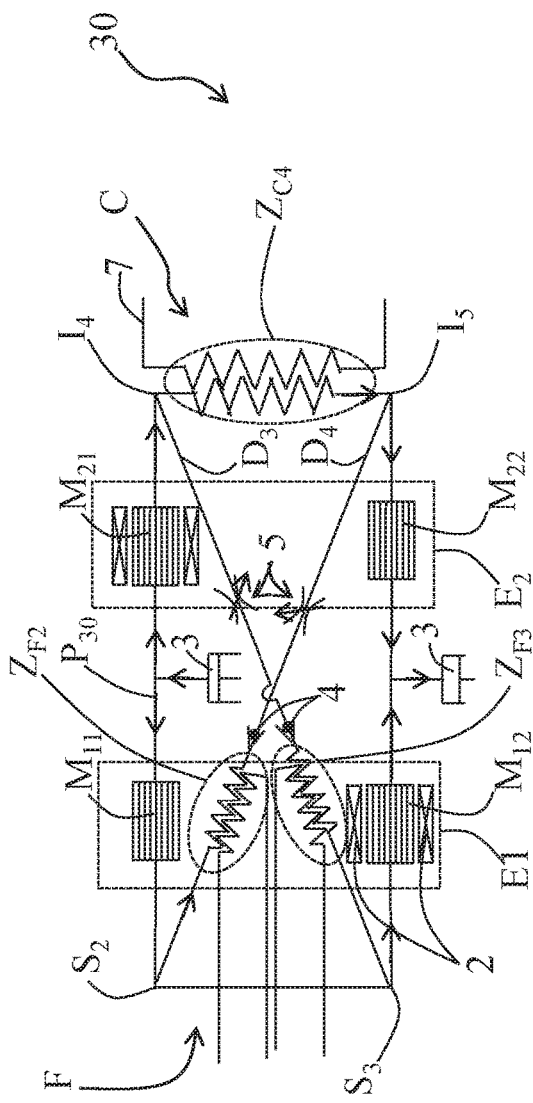
FIGS. 3A and 3B are schematic views of two stages of a thermal generator according to a third embodiment variant, in opposite magnetic phases.

In the illustrated embodiment examples, the identical elements or parts have the same numerical references.

The invention relates to a magnetocaloric thermal generator 10, 20, 30, 40, 50, 60, 70, 80, 90, 100, 110 comprising magnetocaloric elements $M_{11}$, $M_{12}$, $M_{21}$, $M_{22}$, $M_{111}$, $M_{112}$, $M_{113}$, $M_{114}$, $M_{221}$, $M_{222}$, $M_{223}$, $M_{224}$. In the illustrated embodiment variants, these magnetocaloric elements $M_{11}$, $M_{12}$, $M_{21}$, $M_{22}$, $M_{111}$, $M_{112}$, $M_{113}$, $M_{114}$, $M_{221}$, $M_{222}$, $M_{223}$, $M_{224}$ are distributed in at least two thermal stages. A heat transfer fluid called primary fluid is displaced in an alternating movement in at least one primary circuit passing through said magnetocaloric elements $M_{11}$, $M_{12}$, $M_{21}$, $M_{22}$, $M_{111}$, $M_{112}$, $M_{113}$, $M_{114}$, $M_{221}$, $M_{222}$, $M_{223}$, $M_{224}$. The function of this primary fluid is, on the one hand, to establish and maintain a thermal gradient in the magnetocaloric elements of said thermal stages between two ends of thermal generator 10, 20, 30, 40, 50, 60, 70, 80, that is to say a cold side F and a hot side C and, on the other hand, to allow exchanging or restituting the thermal energy produced in said generator with at least one external application, that is to say not belonging to thermal generator 10, 20, 30, 40, 50, 60, 70, 80, 90, 100, 110. This exchange or this restitution occurs by means of an exchange zone that can be materialized by a heat exchanger. This exchange zone allows achieving a heat exchange between the primary fluid and a secondary fluid of a secondary circuit that belongs to the external application.

Even though this is not illustrated, the invention also provides to have only one stage of magnetocaloric elements.

The primary fluid and the secondary fluid are preferably liquids. The secondary fluid is preferably displaced continuously by a pump or any similar device for cooling, heating or tempering an external application. The primary fluid intended to be in contact with the magnetocaloric elements can be made of water, water with an antifreeze product such as glycol for example, a liquid gas, pressurized or not, or a brine.

Each magnetocaloric element $M_{11}$, $M_{12}$, $M_{21}$, $M_{22}$, $M_{111}$, $M_{112}$, $M_{113}$, $M_{114}$, $M_{221}$, $M_{222}$, $M_{223}$, $M_{224}$ can be made of one or several magnetocaloric materials through which the primary fluid can flow. For the purpose of this invention, a magnetocaloric element must be understood as a physical element comprising magnetocaloric material. A magnetocaloric element can in particular comprise several types of magnetocaloric materials. To that purpose, said magnetocaloric elements can be porous so that their pores form through fluid passages. They can also have the form of one or several solid blocks in which mini or micro channels are machined, molded or injected. They can also be made of an assembly of superposed, possibly grooved plates, between which the heat transfer fluid can flow. They can finally have the form of powder or particles, so that the gaps form fluid passages.

Any other embodiment, allowing the primary fluid to achieve heat exchange with the material making up a magnetocaloric element $M_{11}$, $M_{12}$, $M_{21}$, $M_{22}$, $M_{111}$, $M_{112}$, $M_{113}$, $M_{114}$, $M_{221}$, $M_{222}$, $M_{223}$, $M_{224}$ can of course be suitable. The magnetocaloric materials making up magnetocaloric elements $M_{11}$, $M_{12}$, $M_{21}$, $M_{22}$, $M_{111}$, $M_{112}$, $M_{113}$, $M_{114}$, $M_{221}$, $M_{222}$, $M_{223}$, $M_{224}$ have preferably different Curie temperatures, going from the lowest towards the highest from cold side F towards hot side C.

In the represented embodiment variants, the magnetic system that subjects magnetocaloric elements $M_{11}$, $M_{12}$, $M_{21}$, $M_{22}$, $M_{111}$, $M_{112}$, $M_{113}$, $M_{114}$, $M_{221}$, $M_{222}$, $M_{223}$, $M_{224}$ to a magnetic field variation comprises permanent magnets 2 or similar (FIG. 9), and is moved with respect to said magnetocaloric elements $M_{11}$, $M_{12}$, $M_{21}$, $M_{22}$, $M_{111}$, $M_{112}$, $M_{113}$, $M_{114}$, $M_{221}$, $M_{222}$, $M_{223}$, $M_{224}$ to create alternately in said magnetocaloric elements $M_{11}$, $M_{12}$, $M_{21}$, $M_{22}$, $M_{111}$, $M_{112}$, $M_{113}$, $M_{114}$, $M_{221}$, $M_{222}$, $M_{223}$, $M_{224}$ a heating phase when a magnetic field is applied or increased, then a cooling phase when the magnetic field is removed or decreased. This magnetic system can also have the form of a sequentially powered electromagnet or of any other similar means liable to generate a magnetic field variation. The inversions of the direction of circulation of the primary fluid in the primary circuit are synchronized with the magnetization and demagnetization phases of magnetocaloric elements $M_{11}$, $M_{12}$, $M_{21}$, $M_{22}$, $M_{111}$, $M_{112}$, $M_{113}$, $M_{114}$, $M_{222}$, $M_{223}$, $M_{224}$, in order to establish the highest temperature gradient possible in magnetocaloric elements $M_{11}$, $M_{12}$, $M_{21}$, $M_{22}$, $M_{111}$, $M_{112}$, $M_{113}$, $M_{114}$, $M_{221}$, $M_{222}$, $M_{223}$, $M_{224}$. To that purpose, the primary fluid passing through a magnetocaloric element in heating phase—that is to say magnetized—is displaced towards hot side C and is then displaced towards cold side F when it passes through a magnetocaloric element in cooling phase—that is to say demagnetized. The direction of circulation of the primary fluid is represented by arrows in the attached figures.

FIG. 1 thus represents a primary circuit $P_{10}$ connecting two stages $E_1$, $E_2$ of a magnetocaloric thermal generator 10 according to a first embodiment variant of the invention. The primary circuit connects the two stages $E_1$, $E_2$ and comprises two actuators 3 displacing the primary fluid in an alternating back and forth movement. Primary circuit $P_{10}$ thus comprises two parallel branches of the primary fluid circuit passing through said magnetocaloric elements and connected to each other on hot side C and on cold side F. The magnetic system is illustrated by permanent magnets 2. The two stages $E_1$ and $E_2$ are connected through actuators 3, which are for example pistons moved by a profile of a mobile control cam. Such pistons can be rigid or deformable such as for example a membrane. Of course, any other means able to displace the primary fluid may be used. Moreover, the displacement of a piston or similar can be controlled by an operating device that can be a control cam, a magnetic device, a linear motor or any equivalent means able to move said actuator back and forth.

Moreover, magnetocaloric elements $M_{11}$, $M_{12}$ of stage $E_1$ are connected on cold side F of primary circuit $P_{10}$ and magnetocaloric elements $M_{21}$, $M_{22}$ of stage $E_2$ are connected on hot side C of primary circuit $P_{10}$. According to the invention, cold side F of primary circuit $P_{10}$ comprises an outlet point $S_1$ fluidically connected by a bypass pipe $D_1$ to an injection point $I_1$ In hot side C of said primary circuit $P_{10}$. This bypass pipe $D_1$ comprises a device that only allows the fluid to pass from outlet point $S_1$ towards injection point $I_1$. Such device controlling the direction of circulation of the primary fluid can be for example a cheek valve 4. This bypass pipe $D_1$ passes through a cold exchange zone $Z_{F1}$ where the primary fluid performs a heat, exchange with a secondary fluid of a secondary circuit 6.

So, the fact of forcing the direction of circulation of the fluid in bypass pipe $D_1$ allows making sure that, only the fluid exiting cold side F of a magnetocaloric element in a demagnetization phase can be directed towards this bypass pipe $D_1$, From this results that the cooling capacity of the secondary circuit is optimized.

The primary fluid coming from bypass pipe $D_1$ has heated up after having passed through cold exchange zone $Z_{F1}$. It is however reinjected in hot side C of primary circuit $P_{10}$, so that this heating has a limited impact on the temperature of cold side F of primary circuit $P_{10}$, which is particularly advantageous in the case of refrigeration. This moreover allows achieving a substantial exchange in cold exchange zone $Z_{F1}$.

This embodiment, variant is also transposable to an embodiment with, one single stage, in which the bypass pipe can connect an outlet point of the cold side to an injection point of the hot side of the primary circuit.

Primary circuit $P_{10}$ comprises two consecutive hot exchange zones $Z_{C1}$, $Z_{C2}$ on its hot side C, and injection point $I_1$ is located between these two exchange zones $Z_{C1}$, $Z_{C2}$. This is very advantageous as this allows injecting the primary fluid coming from bypass pipe $D_1$ in the portion of primary circuit $P_{10}$ that passes through a magnetocaloric element in cooling phase. Thus the primary fluid is reinjected towards magnetocaloric element $M_{22}$, which is cooling down in the phase illustrated in FIG. 1A and is reinjected in magnetocaloric element $M_{21}$, which is cooling down in the following or opposite magnetic phase illustrated in FIG. 1B. This also allows furthering the mixing of the fluids at injection point $I_1$.

The hot exchange zones $Z_{C1}$, $Z_{C2}$ allow either evacuating the heat produced by thermal generator 10, or heating up another external application, for example by means of a heat exchange with a second secondary fluid circuit 7.

According to the invention, bypass line $D_1$ can advantageously comprise a flow rate adjusting device 5 for the primary fluid that circulates in it. This adjusting device 5 allows determining the heat exchange capacity between primary circuit $P_{10}$ and secondary circuit 6 in cold exchange zone $Z_{F1}$ and adjusting the head losses between primary circuit $P_{10}$ and bypass pipe $D_1$. This characteristic can be transposed to all embodiment variants represented.

Moreover, in all illustrated examples, the outlet points are located in cold side F of the primary circuit and therefore illustrate magnetocaloric thermal generator configurations optimized for optimal use of their cold output. The invention also provides to position these outlet points in the hot side and to perform a classical exchange in cold side F. Such arrangement allows exploiting the heat produced by the thermal generator while limiting the impact due to this heat exchange on the temperature of hot side C of the primary circuit, which is particularly advantageous in the case of heating. This therefore allows achieving a significant exchange in the exchange zone connected to the bypass pipe whose outlet point is located in the hot side of the primary circuit. In other words, the whole of the illustrated examples can be transposed by inverting hot side C and cold side F in order to obtain a higher capacity to heat or to increase the temperature of a secondary fluid of an external application.

FIGS. 2A and 2B represent an embodiment variant of a primary circuit $P_{20}$ of a magnetocaloric thermal generator 20 that differs from the one represented in FIGS. 1A and 1B by its hot side C. In this variant, hot side C of primary circuit $P_{20}$ comprises one single hot heat exchange zone $Z_{C3}$ whose inlet and outlet form respectively an injection point $I_2$, $I_3$. Bypass pipe $D_2$ divides into two pipe portions and these pipe portions comprise each a check valve. This also ensures that the primary fluid coming from bypass pipe $D_2$ is always reinjected towards magnetocaloric element $M_{21}$, $M_{22}$ that is undergoing cooling. Such configuration with one single hot exchange zone $Z_{C3}$ against two hot exchange zones $Z_{C1}$ and $Z_{C2}$ in thermal generator 10 described previously allows simplifying the construction of thermal generator 20 and thus reducing its cost price.

Figure 3B:
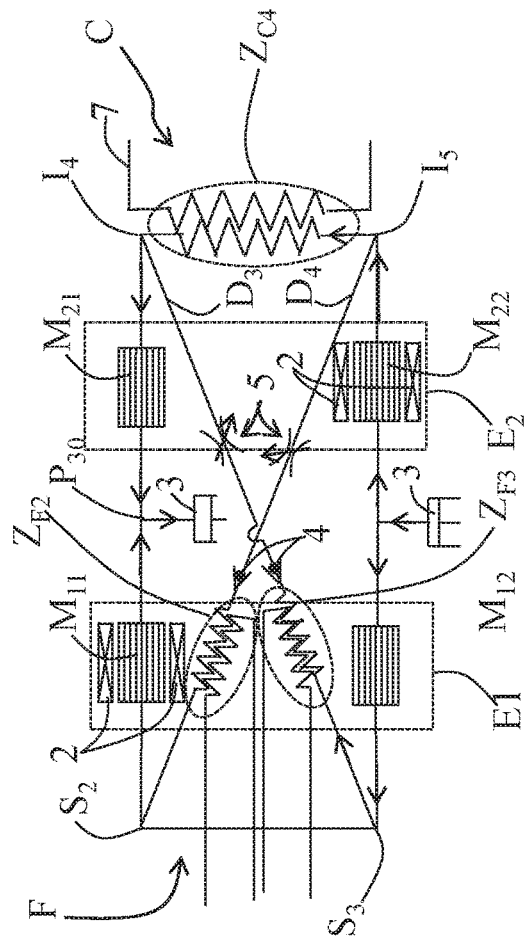

FIGS. 3A and 3B represent another embodiment variant of a magnetocaloric thermal generator 30. In this variant, the generator comprises two bypass pipes $D_3$, $D_4$. Bypass pipe $D_4$ connects an outlet point $S_2$ of cold side F directly connected to a magnetocaloric element $M_{11}$ of stage $E_1$, cold side F, to an injection point $I_5$ of hot side C directly connected to a magnetocaloric element $M_{22}$ of stage $E_2$, hot side C, which is constantly in the same magnetization state as the other magnetocaloric element $M_{11}$, that is to say in cooling phase in FIG. 3A. Likewise, bypass pipe $D_3$ connects an outlet point $S_3$ of cold side F directly connected to a magnetocaloric element $M_{12}$ of stage $E_1$, cold side F, to an injection point $I_4$ of hot side C directly connected to a magnetocaloric element $M_{21}$ of stage $E_2$, hot side C, which is constantly in the same magnetization state as the other magnetocaloric element $M_{12}$, that is to say in heating phase in FIG. 3A. In such configuration and in the magnetization state illustrated in FIG. 3A, the primary fluid is cooled when it passes through magnetocaloric element $M_{11}$ and follows bypass pipe $D_4$ passing through cold exchange zone $Z_{F2}$ to be reinjected at injection point $I_5$ in magnetocaloric element $M_{22}$ of stage $E_2$, hot side C. The fact of reinjecting unidirectionally in hot side C primary fluid coming from cold side F that warmed up in cold heat exchange zone $Z_{F2}$ allows, in the case where this reinjected fluid has a temperature slightly lower or colder than that of the primary fluid in hot side C, to achieve both cooling of magnetocaloric element $M_{22}$ by thermal conduction/transfer with this reinjected fluid and cooling by the magnetocaloric effect due to the demagnetization. This can be equivalent to a pre-cooling of magnetocaloric element $M_{22}$. This can result in shifting downwards the thermal gradient in primary circuit $P_{30}$, between hot side C and cold side F, and thus in increasing the refrigeration capacity of thermal generator 30. In the magnetization state illustrated in FIG. 3A, there is no fluid displacement in second bypass pipe $D_3$. Each bypass branch or pipe is independent, and its flow rate is adjustable separately.

Conversely, in the opposite magnetization state illustrated in FIG. 3B, there is no primary fluid displacement in first bypass pipe $D_4$, while the primary fluid is in displacement in second bypass pipe $D_3$ passing through cold exchange zone $Z_{F3}$ to be reinjected at injection point $I_4$ in magnetocaloric element $M_{21}$ of stage $E_2$, hot side C. The heat exchange on hot side C is achieved in a conventional way. The ends of the two magnetocaloric elements of stage $E_2$, hot side C, are separated by a heat exchange zone $Z_{C4}$ intended for evacuating the heat produced by thermal generator 30 or for heating another external application, for example by means of a heat exchange with a second secondary fluid circuit 7.

FIGS. 4A and 4B represent an embodiment variant of a magnetocaloric thermal generator 40 that differs from thermal generator 30 of the previous figures by the fact that injection points $I_6$ and $I_2$ of bypass pipes $D_5$ and $D_6$ are located between the two stages $E_1$, $E_2$. This arrangement is particularly advantageous in cases when the temperature of the primary fluid reinjected in primary circuit $P_{40}$ corresponds or is liable to correspond to that of the primary fluid at injection point $I_6$, $I_7$ located between the two stages $E_1$, $E_2$.

Figure 5A:
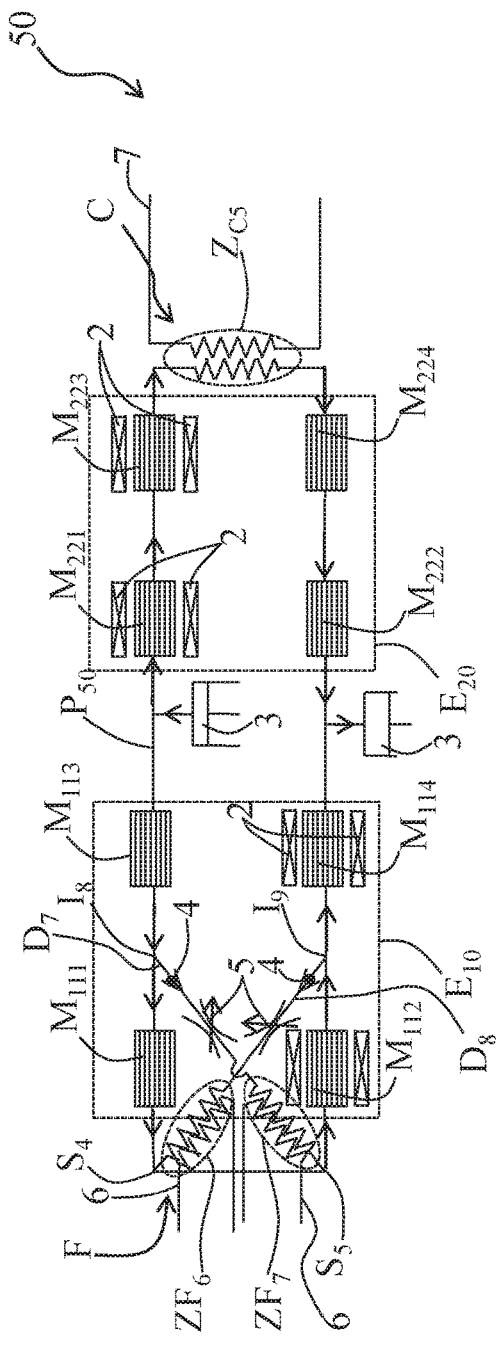
FIGS. 5A and 5B are schematic views of two stages of a thermal generator according to a fifth embodiment variant, in opposite magnetic phases.
Figure 5B:
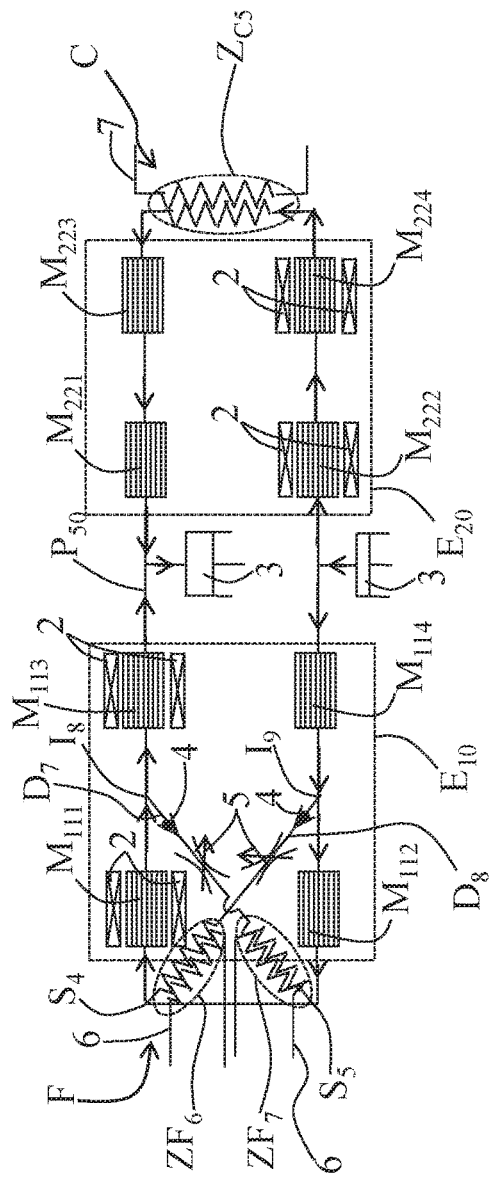

FIGS. 5A and 5B represent an embodiment variant of a magnetocaloric thermal generator 50 that differs from thermal generator 40 of previous FIGS. 4A and 4B by the fact, on the one hand, that the stages comprise more magnetocaloric elements $M_{111}$, $M_{112}$, $M_{113}$, $M_{114}$, $M_{221}$, $M_{222}$, $M_{223}$, $M_{224}$ on the other hand, that injection points $I_8$ and $I_9$ of bypass pipes $D_7$ and $D_8$ are located between the consecutive magnetocaloric elements $M_{111}$, $M_{113}$, and $M_{112}$, $M_{114}$ of stage $E_{10}$ located on cold side F. This arrangement is particularly advantageous in cases when the temperature of the primary fluid exiting a cold exchange zone $Z_{F6}$, $Z_{F7}$ is close to the temperature of the primary fluid that circulates between the consecutive concerned materials $M_{111}$, $M_{113}$ and $M_{112}$, $M_{114}$. In fact, reinjecting in primary circuit $P_{50}$ primary fluid that has the same temperature as the fluid that circulates in the primary circuit does not affect the thermal gradient established in the primary circuit. This allows exploiting the thermal output of thermal generator 50 by means of cold exchange zones $Z_{F6}$, $Z_{F7}$ without negative impact on its efficiency.

In addition, implanting more magnetocaloric elements in thermal generator 50 allows increasing its thermal output and/or its thermal gradient.

The magnetocaloric thermal generator 60 represented in FIGS. 6A and 6B is an embodiment variant of thermal generator 40 of FIGS. 4A and 4B and differs from it by the fact that it comprises only one bypass pipe $D_9$ with an exchange zone $Z_{F8}$, this pipe dividing into two portions after cold exchange zone $Z_{F8}$ to reinject the primary fluid at injection points $I_6$ and $I_7$. This reinjection is the same as that described in reference to FIGS. 4A and 4B. It has the additional advantage of reducing the volume of thermal generator 60, as it requires fewer pipes for the circulation of the primary fluid.

The magnetocaloric thermal generator 70 represented in FIGS. 7A, 7B and 9 is an embodiment variant of thermal generator 60 of previous FIGS. 6A and 6B and differs from it by the fact that stages $E_{10}$ and $E_{20}$ comprise more magnetocaloric elements $M_{111}$, $M_{112}$, $M_{113}$, $M_{114}$, $M_{221}$, $M_{222}$, $M_{223}$, $M_{224}$, in order to increase the thermal output and/or the thermal gradient of the latter and therefore to increase its capacity to cool the secondary fluid of a secondary circuit by means of a cold exchange zone $Z_{F9}$. Primary circuit $P_{70}$ comprises one single bypass pipe $D_{10}$ with an exchange zone $Z_{F9}$, this pipe dividing into two portions after cold exchange zone $Z_{F9}$ to reinject the primary fluid at injection points $I_{10}$ and $I_{11}$ between the two stages $E_{10}$, $E_{20}$. FIG. 9 is a perspective view of this thermal generator 70 comprising three primary circuits, in the magnetization state represented in FIG. 7B. All components of the three primary circuits are not visible on this figure. This FIG. 9 identifies in particular the three cold heat exchange zones $Z_{F9}$, $Z'_{F9}$ and $Z''_{F9}$ of the three primary circuits of thermal generator 70, as well as a hot heat exchange zone $Z'_{C5}$ of one of said primary circuits. The thermal generator 70 comprises a magnetic arrangement with three magnetic rotors $R_1$, $R_2$, $R_3$ which, due to their rotation about the longitudinal axis of thermal generator 70, subject the magnetocaloric elements to a magnetic field variation. The magnetic rotors $R_1$, $R_2$, $R_3$ comprise each a frame on which permanent magnets 2 are mounted. The magnetocaloric elements are mounted in two fixed supports $S_{UP1}$, $S_{UP2}$. The primary fluid is displaced by actuators formed by pistons 3 actuated by a control cam $C_{70}$ whose cam profile is realized, installed, machined or calked on rotor $R_2$.

Figure 8A:
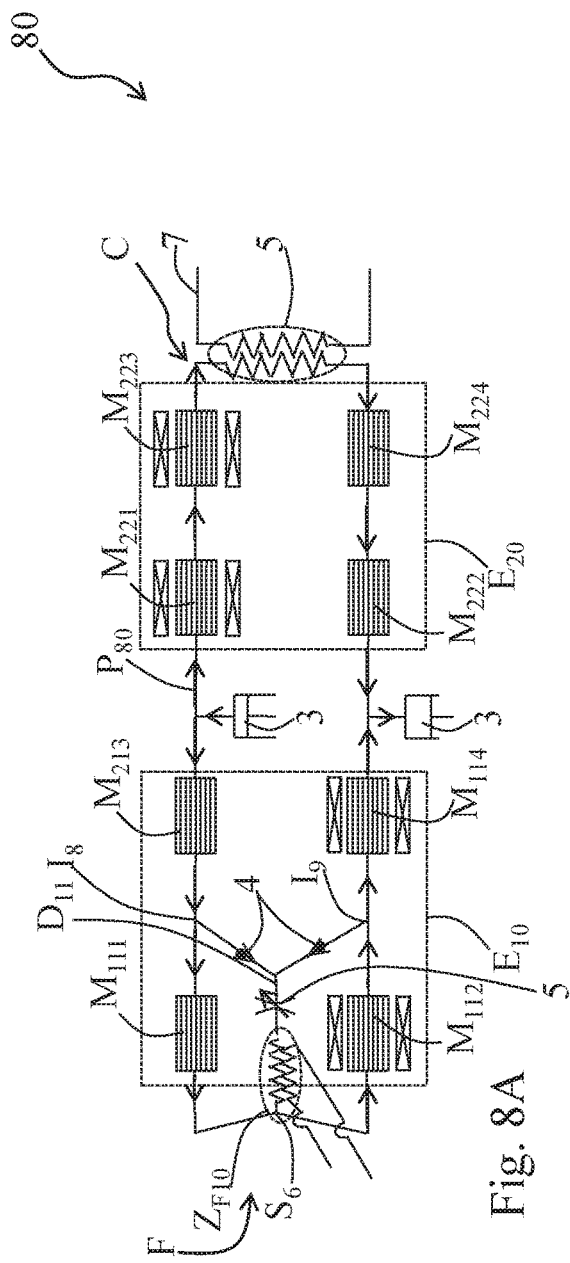
FIGS. 8A and 8B are schematic views of two stages of a thermal generator according to an eighth embodiment variant, in opposite magnetic phases.
Figure 8B:
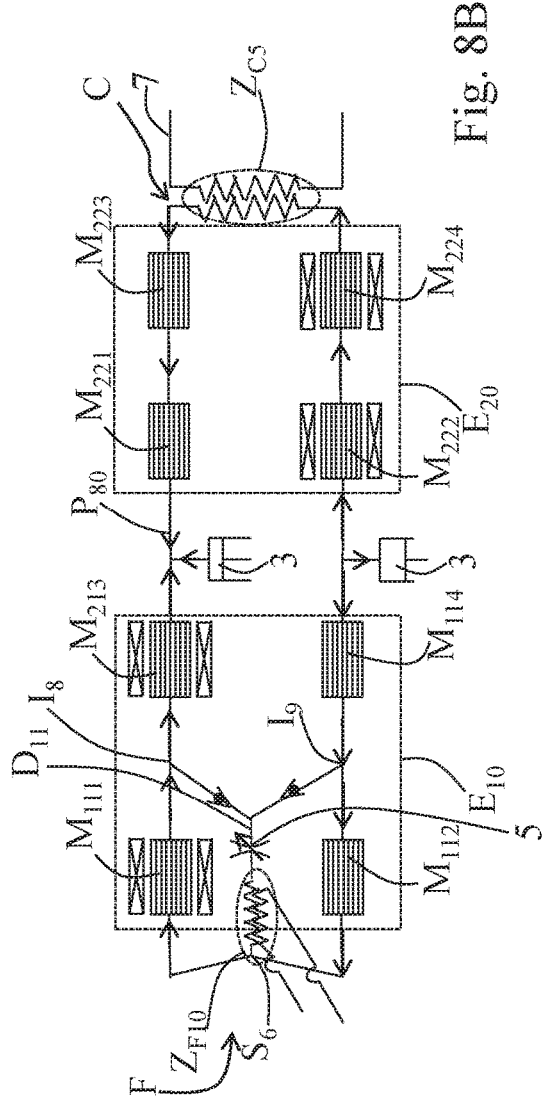

The magnetocaloric thermal generator 80 represented in FIGS. 8A and 8B is an embodiment variant of thermal generator 50 of FIGS. 5A and 5B and differs from it by the fact that it comprises only one bypass pipe $D_{11}$ with an exchange zone $Z_{F10}$, this pipe dividing into two portions after cold exchange zone $Z_{F10}$ to reinject the primary fluid at injection points $I_8$ and $I_9$. This reinjection is the same as that described in reference to FIGS. 5A and 5B. It has the additional advantage of reducing the volume of thermal generator 80, as it requires fewer pipes for the circulation of the primary fluid.

Figure 10A:
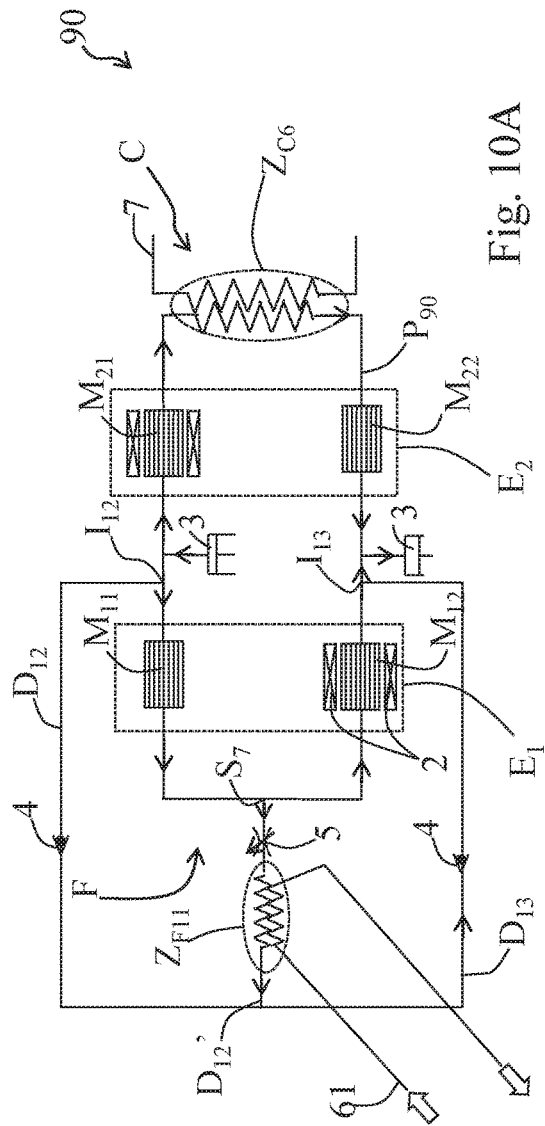
Figure 10B:
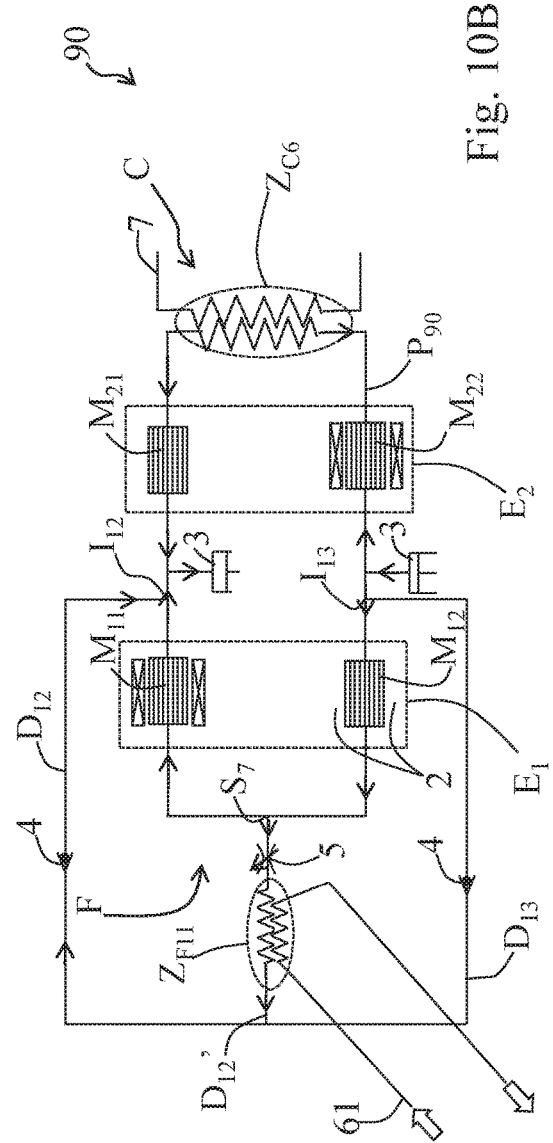

The magnetocaloric thermal generator 90 represented in FIGS. 10A and 10B comprises two bypass pipes $D_{12}$ and $D_{13}$ that have a common bypass pipe portion $D_{12}'$. The thermal generator 90 comprises two stages $E_1$ and $E_2$ connected by primary fluid displacement means or actuators 3. A first stage $E_1$ is positioned on cold &de F of thermal generator 90 and the other stage $E_2$ is positioned on hot side C.

The first bypass pipe $D_{12}$ connects outlet point $S_7$ on cold end F of thermal generator 90 to injection point $I_{12}$ located in primary circuit $P_{90}$, on the hot end of stage $E_1$, between actuator 3 and the hot end of magnetocaloric element $M_{11}$. The second bypass pipe $D_{13}$ connects outlet point $S_7$ on cold end F of thermal generator 90 to the other point of the primary circuit located on the hot side of first stage $E_1$, located between an actuator 3 and the hot end of magnetocaloric element $M_{12}$. Bypass pipes $D_{12}$ and $D_{13}$ comprise a common pipe portion $D_{12}'$, in which a cold exchange zone $Z_{F11}$ intended for achieving the heat exchange between the primary fluid and a secondary fluid of secondary circuit 61 is integrated. Moreover, bypass pipes $D_{12}$ and $D_{13}$ comprise each a device that controls the direction of circulation of the primary fluid.

So, the common bypass pipe portion $D_{12}'$ that comprises a heat exchanger able to perform a heat exchange with the secondary heat transfer fluid of secondary circuit 61 receives the primary fluid exiting the cold side of magnetocaloric elements $M_{11}$ and $M_{12}$ of stage $E_1$ located on cold side F when they are in a demagnetization phase. This way, the primary fluid always passes through this common bypass pipe portion $D_{12}'$ when it has reached the coldest temperature of the cycle. From this results that the heat exchange in exchange zone $Z_{F11}$ is optimized. Moreover, the primary fluid that has undergone a raise of its temperature due to the heat exchange with the secondary circuit to be cooled is then reinjected in the primary circuit, between thermal stages $E_1$ and $E_2$, at a point $I_{12}$, $I_{13}$ of the primary circuit where the temperature is not the lowest. The possibility to adjust the fluid How rate that can circulate towards bypass pipes $D_{12}$ and $D_{13}$ in order to regulate the thermal power that can be exchanged between the primary circuit and the secondary circuit in exchange zone $Z_{F11}$ is particularly advantageous. So, the higher the volume flow of the primary fluid passing through this exchange zone $Z_{F11}$ will be, the more important the exchange will be, Advantageously, thanks to the positioning of exchange zone $Z_{F11}$ in a bypass pipe, the raise of the temperature of the primary fluid due to the heat exchange in exchange zone $Z_{F11}$ has very little, or even no impact on the operation of thermal generator 90, in particular on its ability to maintain a thermal gradient with a high efficiency. This is made possible by the reinjection of the primary fluid heated after a heat exchange in a zone of primary circuit $P_{90}$ where the temperature of the primary fluid is not the lowest.

The thermal generator 90 represented in FIGS. 10A and 10B is particularly advantageous for cooling or tempering in continuous operation a secondary fluid that circulates continuously in the secondary circuit through exchange zone $Z_{F11}$. In fact, the positioning of heat exchange zone $Z_{F11}$ integrated serially in bypass pipes $D_{12}$, $D_{13}$ in which the primary fluid circulates unidirectionally allows achieving a cross-flow exchange in heat exchange zone $Z_{F11}$, which favors the heat exchange.

The magnetocaloric thermal generator 100 represented in FIGS. 11A and 11B presents the same advantages as those described in relation with thermal generator 90. It differs from it by the displacement of the primary fluid in a primary circuit $P_{100}$ and by the magnetic cycles of magnetocaloric elements $M_{11}$, $M_{12}$, $M_{21}$ and $M_{22}$. In fact, in the primary circuit $P_{100}$ represented, the magnetocaloric elements are connected serially and a means for displacing the primary fluid or actuator 3 ensures the alternated displacement of the primary fluid in two opposite directions. The primary fluid passes through magnetocaloric elements $M_{11}$, $M_{12}$, $M_{21}$ and $M_{22}$ towards cold side F of thermal generator 100 when they are in a demagnetized state and it passes through magnetocaloric elements $M_{11}$, $M_{12}$, $M_{21}$ and $M_{22}$ towards hot side C when they are in a magnetized state. The injection points $I_{12}$ and $I_{13}$ of the bypass pipes are positioned between magnetocaloric elements $M_{11}$, $M_{21}$ and $M_{12}$, $M_{22}$ that are, in this variant, in a same magnetization state.

Figure 12A:
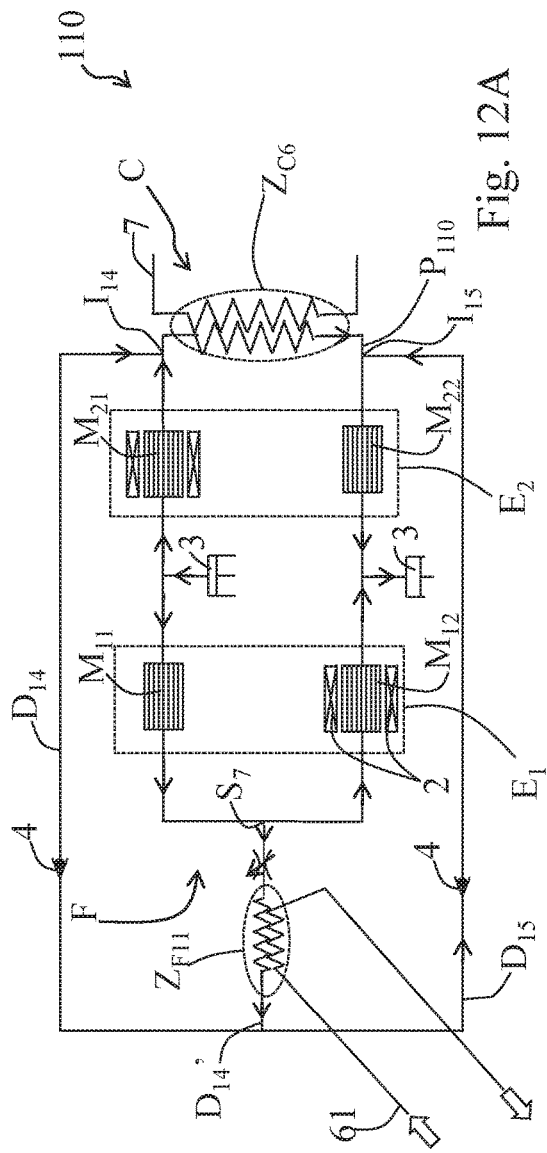
FIGS. 12A and 12B are schematic views of two stages of a thermal generator according to an eleventh embodiment variant, in opposite magnetic phases.
Figure 12B:
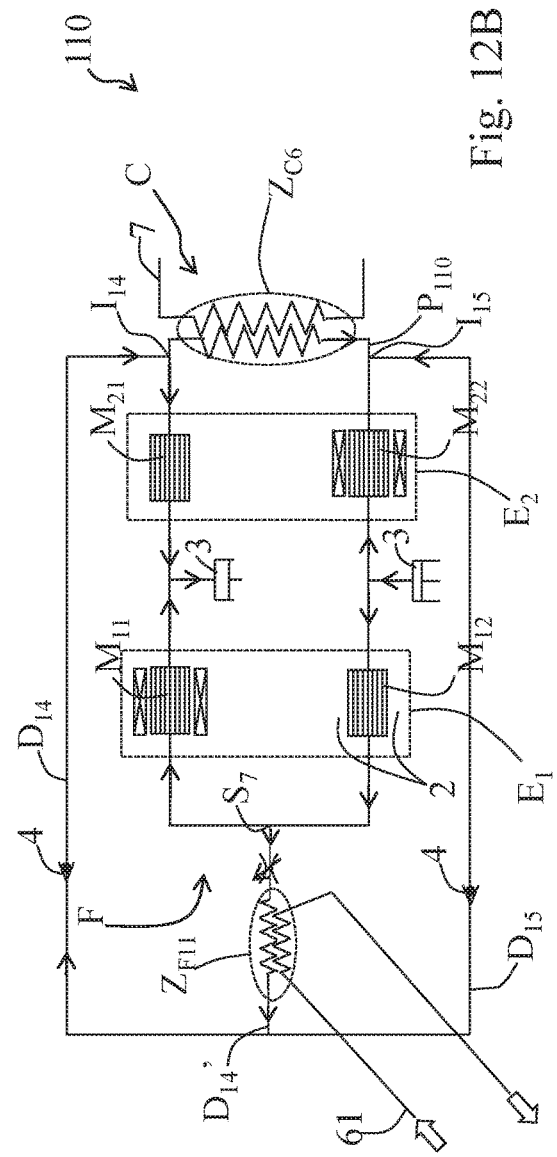

The magnetocaloric thermal generator 110 represented in FIGS. 12A and 12B presents the same advantages as those described in relation with thermal generator 90. It differs from it by the positioning of injection points $I_{14}$ and $I_{15}$ of bypass pipes $D_{14}$ and $D_{15}$. In fact, each injection point $I_{14}$ and $I_{15}$ is positioned between a magnetocaloric element $M_{21}$, $M_{22}$ of hot stage $E_2$ and hot exchange zone $Z_{C6}$. Each injection point $I_{14}$ and $I_{15}$ thus allows injecting primary fluid whose temperature has been raised in cold exchange zone $Z_{F11}$ in the primary circuit, at the outlet of a magnetocaloric element. $M_{21}$ or $M_{22}$, from which the primary fluid having undergone heating exits and flows towards hot exchange zone $Z_{C6}$. Here too, the impact of the heat exchange on the temperature of the primary fluid is reduced, which allows achieving a heat exchange in cold exchange zone $Z_{F11}$ without decreasing the efficiency of thermal generator 110.

Of course, the magnetocaloric thermal generator 10, 20, 30, 40, 50, 60, 70, 80, 90, 100, 110 according to the invention can comprise several primary circuits. Moreover, these primary circuits can comprise a number of magnetocaloric elements different from what is represented in the attached figures.

Moreover, the shape of magnetocaloric elements $M_{11}$, $M_{12}$, $M_{21}$, $M_{22}$, $M_{111}$, $M_{112}$, $M_{113}$, $M_{114}$, $M_{221}$, $M_{222}$, $M_{223}$ and $M_{224}$ is not restricted to a rectangular part. Another shape can be considered. In addition, every magnetocaloric element can be made of several parts attached or fluidically connected in series to each other.

POSSIBILITIES FOR INDUSTRIAL APPLICATION

This description shows clearly that the invention allows reaching the goals defined, that is to say allow achieving an important heat exchange either on cold side F or on hot side C of magnetocaloric thermal generator 10, 20, 30, 40, 50, 60, 70, 80, 90, 100, 110 without disturbing the operation of the latter while optimizing its efficiency.

The thermal generator, as well as the method according to the invention, can find an application in all thermal areas, such as for example the area of heating, air conditioning, tempering, cooling or others, however without being restricted to these, at competitive costs and with reduced space requirements.

The present invention is not restricted to the examples of embodiment described, but extends to any modification and variant which is obvious to a person skilled in the art while remaining within the scope of the protection defined in the attached claims.

The invention claimed is:

1. A magnetocaloric thermal generator (10, 20, 30, 40, 50, 60, 70, 80) comprising:
   at least one primary circuit (P10, P20, P30, P40, P50, P60, P70) fluidically connecting magnetocaloric elements (M11, M12, M21, M22, M111, M112, M113, M114, M221, M222, M223, M224) by a heat transfer primary fluid flowing alternately back and forth,
   the magnetocaloric elements (M11, M12, M21, M22, M111, M112, M113, M114, M221, M222, M223, M224) being subjected to a variable magnetic field of a magnetic system (2) that alternately creates, in each of the magnetocaloric elements (M11, M12, M21, M22, M111, M112, M113, M114, M221, M222, M223, M224), a magnetic heating phase and a magnetic cooling phase generator,
   the primary circuit comprises a cold side (F) and a hot side (C) at which the magnetocaloric elements (M11, M12; M111, M112 et M21, M22, M223, M224) are fluidically connected with each other, wherein
   at least one of the hot (C) and the cold (F) sides of the primary circuit comprises at least one outlet point (S1, S2, S3, S4, S5, S6) connected to an injection point (I1, I2, I3, I4, I5, I6, I7, I8, I9, I10, I11) provided at the other one of the cold (F) and the hot (C) side of the primary circuit by at least one bypass pipe (D1, D2, D3, D4, D5, D6, D7, D8, D9, D10, D11) allowing the primary fluid to be displaced only from the outlet point (S1, S2,S3, S4, S5, S6) towards the injection point (I1, I2, I3, I4, I5, I6, I7, I8, I9, I10, I11).

2. The thermal generator according to claim 1, wherein the magnetocaloric elements (M11, M12, M21, M22, M111, M112, M113, M114, M221, M222, M223, M224) are distributed in at least first and second stages (E1, E2, E10, E20), and the magnetocaloric elements (M11, M12; M111,M112) of the first stage (E1, E10) are connected fluidically with each other on the cold side (F), and the magnetocaloric elements (M21, M22, M223, M224) of the second stage (E2, E20) are connected fluidically with each other on the hot side (C).

3. The thermal generator according to claim 1, wherein the bypass pipe (D1, D2, D3, D4, D5, D6, D7, D8, D9, D10, D11) is thermally connected to a secondary circuit (6) by at least one heat exchange zone (ZF1, ZF2, ZF3, ZF4, ZF5, ZF6, ZF7, ZF8, ZF9, ZF10, ZF11).

4. The thermal generator according to claim 3, wherein the heat exchange zone (ZF1, ZF2, ZF3, ZF4, ZF5, ZF6, ZF7, ZF8, ZF9, ZF10, ZF11) is designed to achieve a counter-current displacement between the primary fluid and a secondary fluid of the secondary circuit (6).

5. The thermal generator according to claim 3, wherein the heat exchange zone (ZF1, ZF2, ZF3, ZF4, ZF5, ZF6, ZF7, ZF8, ZF9, ZF10) is designed to achieve a co-current displacement between the primary fluid and a secondary fluid of the secondary circuit (6).

6. The thermal generator according to claim 3, wherein the heat exchange zone (ZF1, ZF2, ZF3, ZF4, ZF5, ZF6, ZF7, ZF8, ZF9, ZF10) is designed to achieve a cross-current displacement between the primary fluid and a secondary fluid of the secondary circuit (6).

7. The thermal generator according to claim 1, wherein the bypass pipe (D1, D2, D3, D4, D5, D6, D7, D8, D9, D10, D11) comprises a device (5) for adjusting a flow rate of the primary fluid that circulates therein.

8. The thermal generator according to claim 1, wherein the at least one outlet point (S1, S2, S3, S4, S5, S6) is boated in the cold side (F) of the primary circuit.

9. The thermal generator according to claim 1, wherein the at least one outlet point is located in the hot side (C) of the primary circuit.

10. The thermal generator according to claim 8, wherein the injection point (I1, I2, I3, I4, I5) is located in the hot side (C) of the primary circuit.

11. The thermal generator according to claim 9, wherein the injection point is located in the cold side (F) of the primary circuit.

12. The thermal generator according to claim 1, wherein the injection point (I6, I7, I10, I11, I12, I13) is located between first and second stages (E1, E2; E10, E20) of the magnetocaloric elements (M11, M12, M21, M22, M111, M112, M113, M114, M221, M222, M223, M224).

13. The thermal generator according to claim 1, wherein the injection point (I8, I9) is located between consecutive magnetocaloric elements (M111, M112, M113, M114, M221, M222, M223, M224) of each stage (E13, E20).

14. A method of cooling a secondary fluid by a magnetocaloric thermal generator (10, 20, 30, 40, 50, 60, 70, 80) that has at least one primary circuit (P10, P20, P30, P40, P50, P60, P70) fluidically connecting magnetocaloric elements (M11, M12, M21, M22, M111, M112, M113, M114, M221, M222, M223, M224) by a heat transfer primary fluid flowing alternately back and forth, the magnetocaloric elements (M11, M12, M21, M22, M111, M112, M113, M114, M221, M222, M223, M224) being subjected to a variable magnetic field of a magnetic system (2) that alternately creates, in each of the magnetocaloric elements (M11, M12, M21, M22, M111, M112, M113, M114, M221, M222, M223, M224), a magnetic heating phase and a magnetic cooling phase generator, the primary circuit comprises a cold side (F) and a hot side (C) at which the magnetocaloric elements (M11, M12; M111, M112 et M21, M22, M223, M224) are fluidically connected with one another, at least one of the hot (C) and the cold (F) sides of the primary circuit includes at least one outlet point (S1, S2, S3, S4, S5, S6) connected to an injection point (I1, I2, I3, I4, I5, I6, I7, I8, I9, I10, I11) provided at the other one of the cold (F) the hot (C) side of the primary circuit by at least one bypass pipe (D1, D2, D3, D4, D5, D6, D7, D8, D9, D10, D11) allowing the primary fluid to be displaced only from the outlet point (S1, S2, S3, S4, S5, S6) towards the injection point (I1, I2, I3, I4, I5, I6, I7, I8, I9, I10, I11), the method comprising:
   thermally connecting the secondary circuit (6) in which the secondary fluid circulates by at least one heat exchange zone (ZF1, ZF2, ZF3, ZF4, ZF5, ZF6, ZF7, ZF8, ZF9, ZF10, ZF11) to the at least one bypass pipe (D1, D2, D3, D4, D5, D6, D7, D8, D9, D10, D11) of the magnetocaloric thermal generator, and
   continuously circulating the secondary fluid in the secondary circuit.

* * * * *